United States Patent Office 3,093,179
Patented June 11, 1963

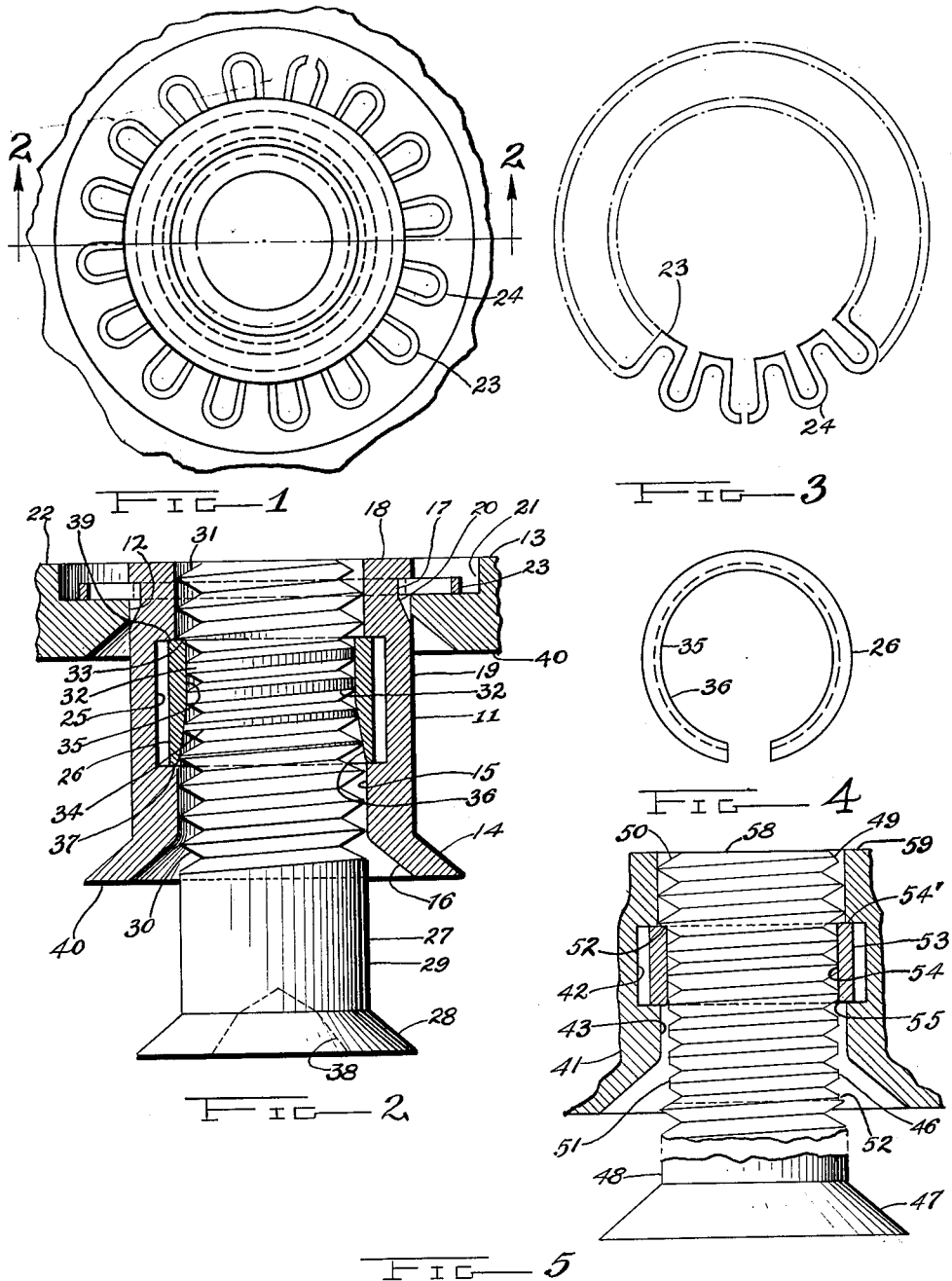

3,093,179
STUD AND GROMMET HAVING RESILIENT
MEANS WITHIN THE GROMMET TO HOLD
THE STUD AND GROMMET IN ASSEMBLY
Victor F. Zahodiakin, River Road and Morris Turnpike,
Summit, N.J.
Filed June 8, 1959, Ser. No. 818,720
5 Claims. (Cl. 151—69)

This invention relates generally to rotary fasteners and specifically to a stud and grommet assembly adapted for use in a rotary fastener.

Most rotary type fasteners consist of a receptacle rigidly secured to a fixed or stationary panel, and a grommet and stud assembly slidably secured to a removable panel. It is most desirable if not necessary that the stud and grommet assembly be secured against disengagement from the removable panel. At the same time, the stud and grommet assembly should lie flush to the abutting surface of the removable panel when disengaged from the receptacle. It is also most desirable that the stud project below the removable panel when disengaged from the receptacle. Most rotary fasteners in common use employ a slidable grommet with a stud secured therein. The stud is frequently provided with longitudinal grooves terminating immediately below the top to facilitate sliding within the grommet. This design requires a snap ring, located within the grommet, to slidably secure the stud to the grommet. Detents on the snap ring ride in the longitudinal grooves in the stud and abut against the top of the stud thereby securing it against complete disengagement from the grommet. However, in this type of assembly, the stud projects above the top of the removable panel. In order to compensate for the top of the stud and a snap ring which secures the grommet to the panel, the panel must be deeply counterbored if the stud and grommet assembly is to lie flush with the surface of the panel. In relatively thin panels, such a deep counterbore would dangerous weaken the structure or would be physically impossible. Moreover, it has been found that the detents on the snap ring commonly employed to secure the stud within the grommet are fragile and frequently break, rendering the entire structure useless.

Therefore, it is among the objects and advantages of my invention to provide a stud and grommet assembly adapted for use in rotary fasteners for securing together a variety of structural elements.

Another object of my invention is to provide a stud and grommet assembly in which the grommet is slidably secured within a bore in a structural element.

Yet another object of my invention is to provide a stud and grommet assembly in which the stud is slidably mounted within the grommet.

Still a further object of my invention is to provide a stud and grommet assembly which will lie flush with the top surface of a relatively thin structural element to which it is secured when disengaged from the receptacle in the opposed panel.

A further object of my invention is to provide a stud and grommet assembly in which a grooveless stud may be permanently but slidably secured within a grommet by a compressible, split snap ring or collar.

Still another object of my invention is to provide a stud and grommet assembly in which resilient members are resistant to permanent deformation by the action of extremely high temperatures.

Yet a further object of my invention is to provide a stud and grommet assembly where the stud will be forced to project below the bottom of the grommet when disengaged from the receptacle without the use of coil springs or other spring means.

Another object of my invention is to provide a stud and grommet assembly which employs a stud shank diameter substantially equal to the major diameter to the treads of the stud, thereby substantially increasing the tensile strength and shear load of the fastener.

Still a further object of my invention is to provide a stud and grommet assembly in which a split, resilient, retainer ring formed in the shape of a plurality of connected, U-shaped, radial convolutions, secures the grommet to the structural member.

These objects and advantages as well as other objects and advantages may be achieved by my invention, one embodiment of which is shown in the drawings; in which, FIGURE 1 is a top plan view of a stud and grommet assembly.

FIGURE 2 is a side elevational, cross-sectional view of a stud and grommet assembly, taken on line 2—2 on FIGURE 1.

FIGURE 3 is a top plan view of a snap ring adapted to slidably secure the grommet to the structural element.

FIGURE 4 is a top plan view of a resilient, split snap ring or collar adapted to slidably secure the stud within the grommet.

FIGURE 5 is a side elevational, cross-sectional view of an alternative stud and grommet assembly embodying my invention having the sides of the grommet broken away.

Referring now to the drawings in detail, my invention comprises a grommet 11 which is slidably secured within a suitably sized bore 12 in a panel or structural member 13. The grommet 11 is generally cylindrical and is provided with a flared head 14, at one end. The bore 15 is countersunk at 16, at the flared head end of the grommet 11. The opposite end of the grommet is provided with an annular groove 17 spaced a short distance below the upper face 18 of the grommet 11. The side wall 19 of the grommet 11 is provided with an angularly inclined face 20 extending outwardly and downwardly from interior-most portion of the groove 17. The panel 13 is provided with a counterbore 21 sufficiently deep to permit the upper face 18 of the grommet 11 to lie flush with the upper surface 22 of the panel 13. The counterbore 21 is also wide enough to accommodate a resilient, split snap ring 23 when fully expanded to ride on the side wall 19 of the grommet 11. The split snap ring 23 is comprised of a plurality of connected, U-shaped, radial enlargements 24 and may be fabricated of wire or stamped from metal sheet.

The bore 15 of the grommet 11 is provided with an annular, coaxial channel 25 intermediate to its ends. A resilient, split collar 26 is positioned within the annular channel 25. The split collar 26 is sufficiently compressible to reduce its overall diameter to slightly less than the internal diameter of the bore 15 in the grommet 11. When neither compressed nor expanded, the normal outside diameter of the collar 26 is greater than the internal diameter of the bore 15. Thus, the collar 26 may be permanently positioned within the channel 25 by compressing the collar, inserting it into the bore 15, and allowing it to expand into the annular channel 25.

A stud 27 is slidably secured within the bore 15 in the grommet 11. The stud 27 is comprised of a head 28 which is provided with any conventional screw driver receptacle 38, shown in FIGURE 2 to be a Phillips head type. Adjacent to the head 28 is an untheaded shank 29. The remainder of the stud 27 is provided with threads 30. The upper portion 31 of the threads 30, have a through and uninterrupted crest diameter approximately equal to the internal diameter of the bore 15. Immediately adjacent to the upper portion 31 of the threads 30, is a middle portion 32 wherein at least several threads have a through and uninterrupted crest diameter somewhat less than the crest diameter of the threads 30 of the upper portion 31. Thus, there is provided a radial step 33 in the threads 30 at the intersection of the upper portion 31 and the middle portion 32. Immediately below the middle portion 32, there is a flared portion 34 wherein the crest diameter of the threads 30 progressively increases downwardly to equal the crest diameter of the threads 30 in the upper portion 31. The interior of the collar 26 is shaped to closely conform to and normally, resiliently presses firmly against the middle portion 32 and the flared portion 34 of the threads 30. Thus, the collar 26 is provided with a cylindrical interior surface 35 and an outwardly and downwardly flared surface 36. The bottom edge 37 of the collar 26 is suitably rounded to prevent binding with the threads 30. The internal diameter of the annular channel 25 in which the collar 26 is seated is sufficiently large to accommodate the collar 26 when expanded to ride over the largest diameter threads 30 of the stud 27. The collar 26 is sufficiently thick to project into the channel 25 when pressing against the middle portion 32 and flared portion 34 of the threads 30.

In operation, the grommet 11 is inserted into the bore 15 in the panel 13. The expandable, split snap ring 23 is snapped into position in the annular groove 17, thereby securing the grommet 11 against disengagement from the panel 13. The resilient, split collar 26 is positioned within the annular channel 25 in the bore 15 as described above. The stud 27 is then inserted into the bore 15 through the flare-head end. As the relatively wide upper portion 31 of the threads 30 engage the outwardly and downwardly flared interior surface 36 of the collar 26, the collar expands outwardly into the annular channel 25. When the upper portion 31 of the threads 30 have passed beyond the upper edge 39 of the collar 26, the collar springs inwardly by reason of its resilience to press firmly against the middle portion 32 and the flared portion 34 of the threads 30. Thus, the pressure normally exerted by the resilient collar 26 against the stud 27, prevents the stud from loosely moving in or out of the grommet. In addition, the stud 27 is secured against disengagement from the grommet 11 by means of the collar 26. The stud 27 can be withdrawn only until the radial step 33 formed by intersection of the upper portion 31 and the middle portion 32 of the threads 30, engages the upper edge 39 of the collar 26. Since the collar 26 projects into the channel 25, it cannot move further downwardly. Thus, when the radial step 33 abuts against the upper edge 39 of the collar 26, the stud cannot be withdrawn further downwardly. Since the radical step 33 is sharp, the collar will not expand as it does when engaging the flared portion 34 of the threads when the stud is forced upwardly. The stud 27 and the grommet 11 are so designed that they both will lie flush with the upper surface 22 of the panel 13 when the stud is withdrawn downwardly to its lower-most position.

When the panel or structural member 13 is to be secured to an opposed structural member, the stud and grommet assembly is aligned generally below the receptacle in the opposed structural member. A screw driver is inserted into the head 28 of the stud 27, and the stud pushed upwardly into the receptacle. The pressure exerted against the stud 27 by the collar 26, causes the grommet in which it is secured to ascend with the stud into the opening provided in the stationary panel. As the grommet ascends, the snap ring 23 will abut against the lower surface of the opposed panel or structural member, forcing the snap ring to expand and to ride downwardly over the angularly inclined face 20 and finally over the side wall 19 of the grommet 11.

As the upper portion 31 of the threads 30 ascend into the receptacle, they will engage a thread receptacle. The screw driver may then be rotated to fasten the stud into position thereby firmly joining the structural members.

When firmly fastened to the receptacle, the stud and grommet assembly will lie flush with the lower surface 40 of the panel 13.

FIGURE 5 shows an alternative stud and grommet assembly embodying my invention. In this assembly, the grommet 41 is shaped much the same as the grommet 11 shown in FIGURE 2, and is provided with an annular channel 42 intermediate the ends of a coaxial bore 43. The grommet 41 is slidably secured to a structural member or panel by a split snap ring in the same manner as is grommet 11 in FIGURE 2. A stud 46 is provided with a head 47 and an unthreaded shank 48 as is the stud 27 in FIGURE 2. However, the threads 49 of the stud 46 are somewhat different than the threads 30 on stud 27. The threads 49 of the stud 46 are comprised of an upper portion 50 and an adjacent lower portion 51. The threads of the upper portion 50 have a through and uninterrupted crest diameter approximately equal to the diameter of the bore 43. The threads of the lower portion 51 have a through and uninterrupted crest diameter somewhat less than the crest diameter of the threads of the upper portion 50. Thus, there is provided a radial step 52 at the intersection of the threads of the upper portion 50 and the lower portion 51, which step functions in a manner similar to the step 33 shown in FIGURE 2. An annular, resilient, split snap ring or collar 53 is seated within the annular channel 42. The collar 53 is compressible and exandable as is the collar 26 in FIGURE 2. However, the interior surface 54 of the collar 53 is cylindrical, the bottom edge 55 being suitably rounded to prevent binding with the threads 49. The collar 53 resiliently engages the lower portion 51 of the threads 49 for a predetermined distance thereby permitting the stud to slide up and down in the bore of the grommet.

The alternative stud and grommet assembly shown in FIGURE 5 operates in a manner similar to the assembly shown in FIGURE 2. The stud and grommet assembly is slidably secured to the structural member in the same manner. The collar 53 is compressed, inserted into the bore 43 and then seated within the annular channel 42 in the same manner as is collar 26. Similarly, the stud 46 is inserted into the bore 43 and forced upwardly. As the upper portion 50 of the threads 49 on the stud 46 engages the collar 53, the collar expands into the annular channel 42. When the upper portion 50 has passed beyond the upper edge 54' of the collar 53, the collar springs inwardly by reason of its resilience to press firmly against the lower portion 51 of the threads 49. The pressure normally exerted by the resilient collar 53 against the threads 49 of the lower portion 51, prevents the stud 46 from loosely moving in or out of the grommet 41. In addition, the collar 53 slidably secures the stud 46 within the grommet 41. As the stud 46 is withdrawn downwardly, the step 52 formed by the intersection of the upper portion 50 and the lower portion 51 of the threads 49, engages the upper edge 54' of the collar 53 thereby preventing the stud from descending further. The height of the upper portion 50 of the stud, and the height of the collar 53 are adjusted so that the end 58 of the stud 46 will lie flush to the upper surface 59 of the grommet 41, when the stud is withdrawn downwardly to its lowermost position, and, in turn, to the upper surface of the structural member to which it is engaged. However, the height of the collar 53 must be no less than one pitch of the threads 49, otherwse, the collar would bind the stud against normal movement.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:
1. A stud and grommet assembly comprising,
   (a) a grommet having laterally extending abutment means at one end and a generally central bore and an internal, annular channel communicating with the bore and positioned approximately midway between the ends of the bore, said channel having end surfaces substantially at right angles to the bore,
   (b) means engageable with the grommet at a second end thereof, adapted to secure the grommet against disengagement from an aperture into which the grommet can be inserted,
   (c) a threaded stud in the bore, said stud having a head at one end,
   (d) a larger thread-portion of normal threads on the stud at the end opposite to said head,
   (e) a smaller thread-portion on the stud immediately adjacent to the larger thread portion said smaller thread-portion having truncated threads to provide a reduced crest diameter relative to the threads of said larger thread-portion, thereby defining a radial step in the threads, the axial length of the larger thread-portion being no greater than the distance between the top of the annular channel and the top of the grommet,
   (f) a resilient, split collar positively seated within the channel in the bore against movement in the direction of the axis of the bore, the collar having an internal annular face substantially cylindrical and having a height not less than one pitch of the threads on the larger thread-portion, and a top edge adapted to project into the bore, and a bottom edge, said edges extending substantially at right angles to the bore axis, a portion of the top edge and the bottom edge being seated within the annular channel thereby positively detaining the collar in the annular channel, said top edge being adjacent said second end of the grommet,
   (g) the internal annular face of the collar being resiliently and frictionally engaged to the smaller thread-portion of the stud, the collar having a normal contacted position with an internal diameter less than the crest diameter of said smaller thread-portion, the top edge of the collar projecting into the bore and adapted to abut the radial step in the threads of the stud,
   (h) the collar being non-expandable in response to pressure exerted by the radial step in the threads of the stud against its top edge generated by force exerted against the stud tending to withdraw the stud from the bore, the stud thereby being positively detained within the bore, and
   (i) the annular channel in the bore being sufficiently deep to permit the collar to expand radially to pass the larger thread-portion of the stud therethrough.

2. A stud and grommet assembly comprising,
   (a) the structure in accordance with claim 1, and
   (b) the smaller thread-portion of the stud having a crest diameter progressively decreasing toward the radial step and larger thread-portion, and
   (c) the internal face of the collar having a generally outwardly and downwardly flaring portion.

3. A stud and grommet assembly comprising,
   (a) the structure in accordance with claim 1, and
   (b) an external flared head on one end of the grommet, the grommet having an external annular channel at its opposite end,
   (c) an annulus seated within the external channel, and
   (d) a resilient, yieldable split collar seated within the annular channel in the grommet communicating with the bore.

4. A stud and grommet assembly comprising,
   (a) the structure in accordance with claim 1, and
   (b) an external flared head on the end of the grommet,
   (c) the bore in the grommet having a countersink in its end adjacent to the flared head on the grommet.

5. A stud and grommet assembly comprising,
   (a) the structure in accordance with claim 1 in which,
   (b) the smaller thread-portion on the stud has a constant crest diameter substantially smaller than the crest diameter of the larger thread-portion, and
   (c) the larger thread-portion on the stud has a constant crest diameter in close conformity to the diameter of the bore.

References Cited in the file of this patent

UNITED STATES PATENTS

| 1,409,606 | Stendahl | Mar. 14, 1922 |
| 1,758,515 | Heierman | Feb. 3, 1928 |
| 2,798,748 | Maurer | July 4, 1957 |
| 2,896,684 | Zahodiakin | July 28, 1959 |
| 2,929,474 | Boardman | Mar. 22, 1960 |
| 2,948,317 | Munro | Aug. 9, 1960 |
| 2,949,143 | Shuro | Aug. 16, 1960 |
| 2,972,367 | Wootton | Feb. 21, 1961 |
| 2,991,816 | Harbison et al. | July 11, 1961 |
| 3,062,253 | Millheiser | Nov. 6, 1962 |

FOREIGN PATENTS

| 557,464 | Canada | May 13, 1958 |
| 588,215 | Great Britain | May 16, 1947 |
| 596,697 | Great Britain | Jan. 8, 1948 |
| 783,437 | Great Britain | Sept. 25, 1957 |
| 103,125 | Sweden | Dec. 25, 1941 |